(12) United States Patent
Chen et al.

(10) Patent No.: US 8,489,833 B2
(45) Date of Patent: Jul. 16, 2013

(54) DATA BACKUP METHOD FOR FLASH MEMORY MODULE AND SOLID STATE DRIVE

(75) Inventors: Tsung-Heng Chen, Taipei County (TW); Chyi-Kwei Yau, Taipei (TW); Tsang-Yi Chen, Taipei County (TW); Chih-Heng Chiu, Taipei (TW); Chung-Won Shu, Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 455 days.

(21) Appl. No.: 12/860,222

(22) Filed: Aug. 20, 2010

(65) Prior Publication Data

US 2012/0047314 A1 Feb. 23, 2012

(51) Int. Cl.
G06F 12/00 (2006.01)
G06F 13/00 (2006.01)

(52) U.S. Cl.
USPC ............ 711/162; 711/100; 711/154; 711/163

(58) Field of Classification Search
USPC .......................... 711/100, 154, 162, 163, 103
See application file for complete search history.

(56) References Cited

U.S. PATENT DOCUMENTS

| | | | |
|---|---|---|---|
| 6,532,551 B1 * | 3/2003 | Kamei et al. | 714/13 |
| 7,062,600 B2 * | 6/2006 | Yoo | 711/103 |
| 2003/0018892 A1 * | 1/2003 | Tello | 713/164 |
| 2011/0087824 A1 * | 4/2011 | Lin et al. | 711/103 |

* cited by examiner

Primary Examiner — Tuan Thai
(74) Attorney, Agent, or Firm — Winston Hsu; Scott Margo

(57) ABSTRACT

A data backup method for a flash memory module is provided. The flash memory module includes a plurality of flash memory units. In the data backup method, a controller is first provided to receive a backup function enabling signal. The controller then configures the flash memory units according to the backup function enabling signal such that at least one of the flash memory units is configured as a backup storage area and the flash memory units that are not in the backup storage area are configured as a main storage area. The controller then checks and receives an updated status of important data in the main storage area and backs up the important data into the backup storage area according to the updated status. Accessing to the backup storage area and accessing to the main storage area by the controller are independent.

12 Claims, 5 Drawing Sheets

DATA BACKUP METHOD FOR FLASH MEMORY MODULE AND SOLID STATE DRIVE

BACKGROUND OF THE INVENTION

1. Field of the Invention

The present invention relates to a data backup method for a flash memory module and a solid state drive.

2. Description of Related Art

Providing high capacity and long service life non-volatile memory in consumer electronics produces is increasingly important nowadays. With the rapid advancement of the flash memory technology, high capacity and long service life non-volatile memory device constructed by flash memory has become the main stream.

FIG. 1 illustrates a conventional flash memory module 100. Referring to FIG. 1, the flash memory module 100 consists of a plurality of flash memory units 111-13N. The flash memory units 111-13N are grouped into a plurality of channels CH1-CH3. The channel CH1 includes the flash memory units 111-11N, the channel CH2 includes the flash memory units 121-12N, and the channel CH3 includes the flash memory units 131-13N.

In order to speed up data accessing, a single piece of data is conventionally divided into multiple pieces of data that are accessed simultaneously through the respective channels CH1-CH3. As such, the data accessing speed can be several times higher than the speed of accessing through the single flash memory unit. However, this way of accessing also causes the single piece of data to be dispersedly saved in different flash memory units 111-13N. In other words, if a few of the flash memory units 111-13N is damaged, the piece of data is likely to be lost.

Accordingly, data backup of the flash memory module 100 is of particular importance. In addition, in order to prolong the overall life span, a wear leveling technology has been developed in the flash memory module 100. The wear leveling technology can result in an even distribution of erasures of the flash memory units by exchanging the data of those flash memories whose erasures differ greatly. While this technology can extend the overall service life, it can cause the data in the flash memory to be disorder and discontinuous. Therefore, once a few of the flash memory units are damaged, data recovery can be more difficult. Data backup in the flash memory module 100 can also be done simply by using a flash memory module having the same capacity as the flash memory module 100.

SUMMARY OF THE INVENTION

Accordingly, the present invention is directed to a data backup method for a flash memory module which can effectively achieve the backup of important data in a simple way.

The present invention is also directed to a data backup method for a solid state drive which can effectively achieve the backup of important data in a simple way.

The present invention is further directed to a data backup method by using a controller in a flash memory module having a plurality of flash memory units which can effectively achieve the backup of important data in a simple way.

The present invention provides a data backup method for a flash memory module comprising a plurality of flash memory units. The steps of the data backup method comprise: providing a controller to receive a backup function enabling signal, configuring the plurality of flash memory units as a backup storage area and a main storage area by using the controller according to the backup function enabling signal, checking and receiving an updated status of an important data in the main storage area by using the controller, and backing up the important data into the backup storage area according to the updated status. Wherein, accessing to the backup storage area and accessing to the main storage area by the controller are independent.

According to one embodiment, the step of configuring the flash memory units using the controller according to the backup function enabling signal comprises: setting a number of the plurality of flash memory units of the backup storage area and a number of the plurality of flash memory units of the main storage area according to a fixed ratio.

According to one embodiment, the updated status is obtained by comparing the latest updated dates of the important data in the main storage area and in the backup storage area, or by comparing the contents of the important data in the main storage area and in the backup area.

According to one embodiment, the data backup method further comprises formatting the flash memory units of the backup storage area by using the controller.

The present invention additionally provides a data backup method for a solid state drive comprising a plurality of flash memory units. The steps of the data backup method comprise: providing a controller to receive a backup function enabling signal, configuring the plurality of flash memory units as a backup storage area and a main storage area by the controller according to the backup function enabling signal, providing the controller to set a particular folder of the solid state drive in which an important data is saved, and receiving and checking an updated status of the important data in the particular folder by the controller and backing up the important data into the backup storage area according to the updated status. Wherein, accessing to the backup storage area and accessing to the main storage area by the controller are independent.

According to one embodiment, the steps of receiving and checking an updated status of the important data in the particular folder using the controller comprise: reading a physical logical addresses look-up table to find out a master boot record (MBR) using the controller; reading a partition table from the master boot record by the controller; finding out the address of the particular folder according to a root directory of the partition table by the controller; and comparing the important data in the particular folder and in the backup storage area to obtain the updated status by the controller.

According to one embodiment, the data backup method for the solid state drive further comprises reading the important data from the backup storage area using the controller, and copying at least a part of the important data into a storage device at which the particular folder of the main storage area is located.

The present invention provides a data backup method by using a controller in a flash memory module having a plurality of flash memory units. The steps of the data backup method comprises: firstly, receiving a backup function enabling signal, configuring the plurality of flash memory units as a backup storage area and a main storage area and checking and receiving a status of an important data in the main storage area and saving the important data into the backup storage area according to the status.

In view of the foregoing, in embodiments of the present invention, when the backup function of the flash memory module or the solid state drive is enabled, its multiple flash memory units are configured as the main storage area and the backup storage area. The important data in the main storage area is backed up into the backup storage area by the single controller. The key is that accessing to the main storage area and accessing to the backup storage area by the controller are independent and non-related. This can effectively reduce the technical complexity in data backup. As such, the data backup can be achieved simply by the controller embedded in the flash memory module and the solid state drive, which eliminates the need of additional software and hardware that would need due to the technical complexity.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
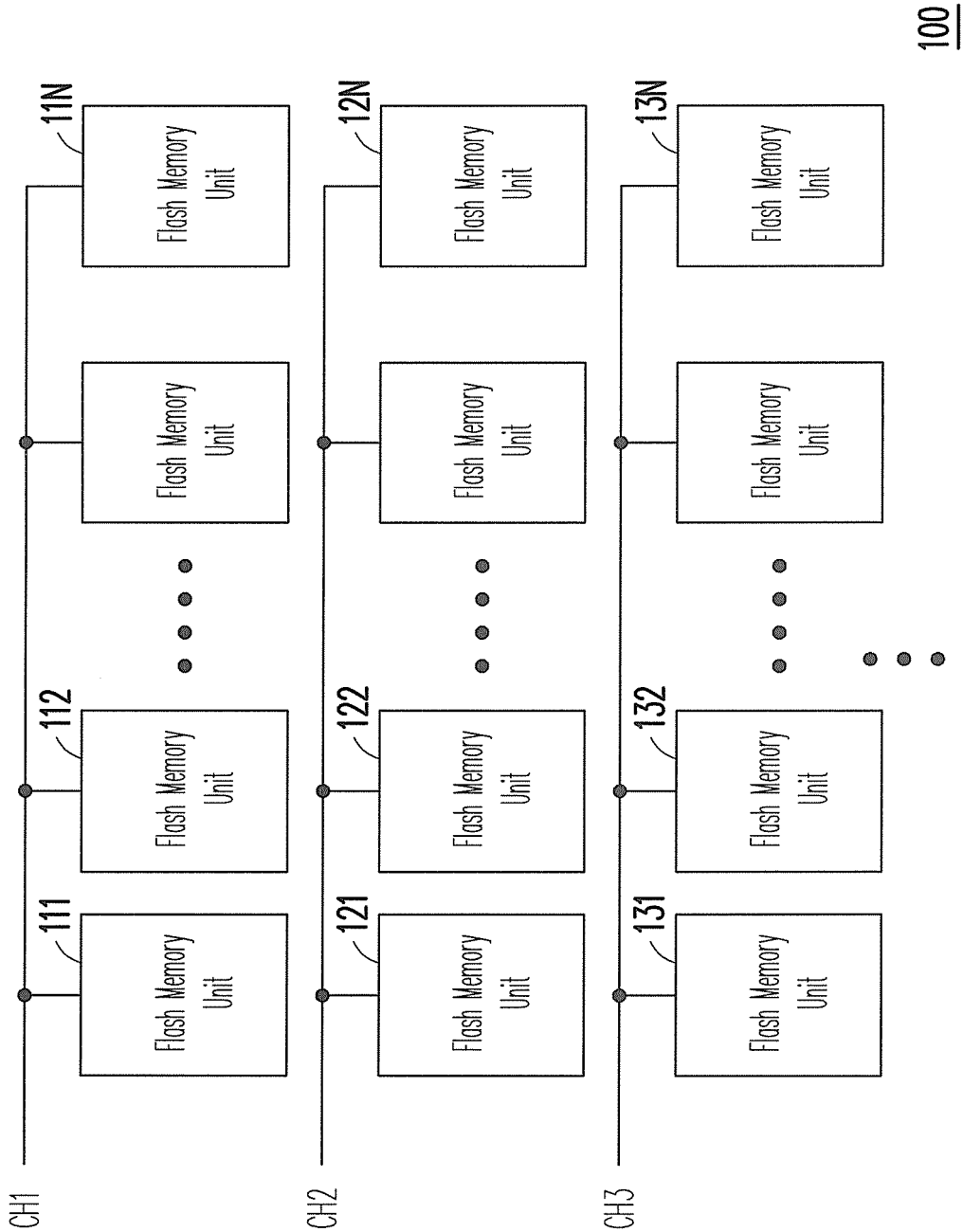
FIG. 1 illustrates a conventional flash memory module.
Figure 2:
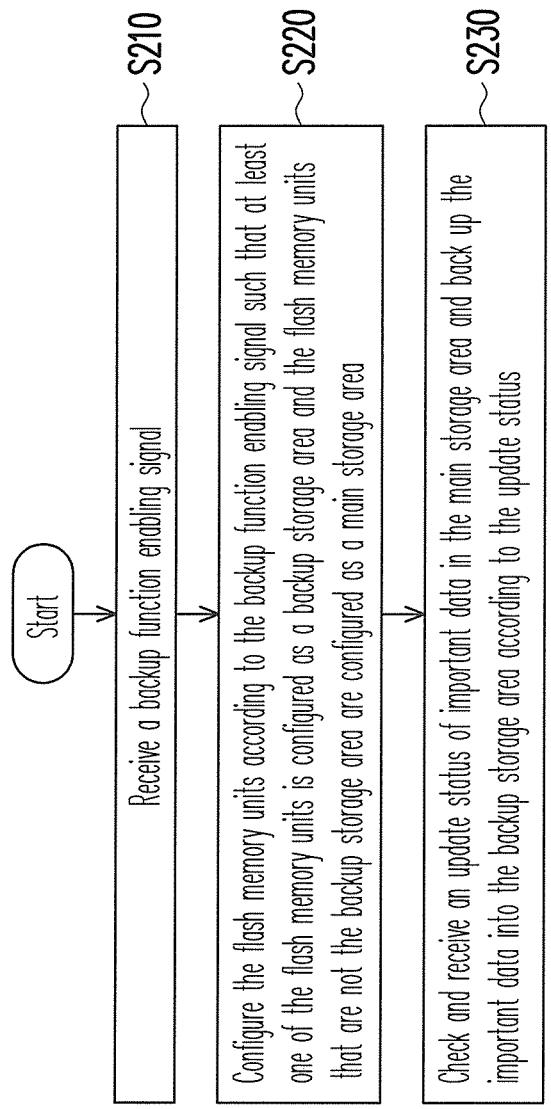
FIG. 2 is a flow chart of a data backup method for a flash memory module according to one embodiment of the present invention.

FIG. 2 is a flow chart of a data backup method for a flash memory module according to one embodiment of the present invention. Referring to FIG. 2, the flash memory module includes a plurality of flash memory units. In the data backup method, a controller embedded in the flash memory module firstly receives a backup function enabling signal (S210). The backup function enabling signal may come from a host, connected to the flash memory module to instruct the controller whether to enable the backup function of the flash memory module. In short, when the backup function enabling signal is an enabling signal (e.g. logic signal "1"), the controller enables the data backup function. On the contrary, when the backup function enabling signal is a disabling signal (e.g. logic signal "0"), the controller disables the data backup function.

After the controller enables the backup function of the flash memory module in response to the backup function enabling signal, the controller configures at least a part of the flash memory units as a backup storage area and at least another part of the flash memory units as a main storage area (S220).

Figure 3:
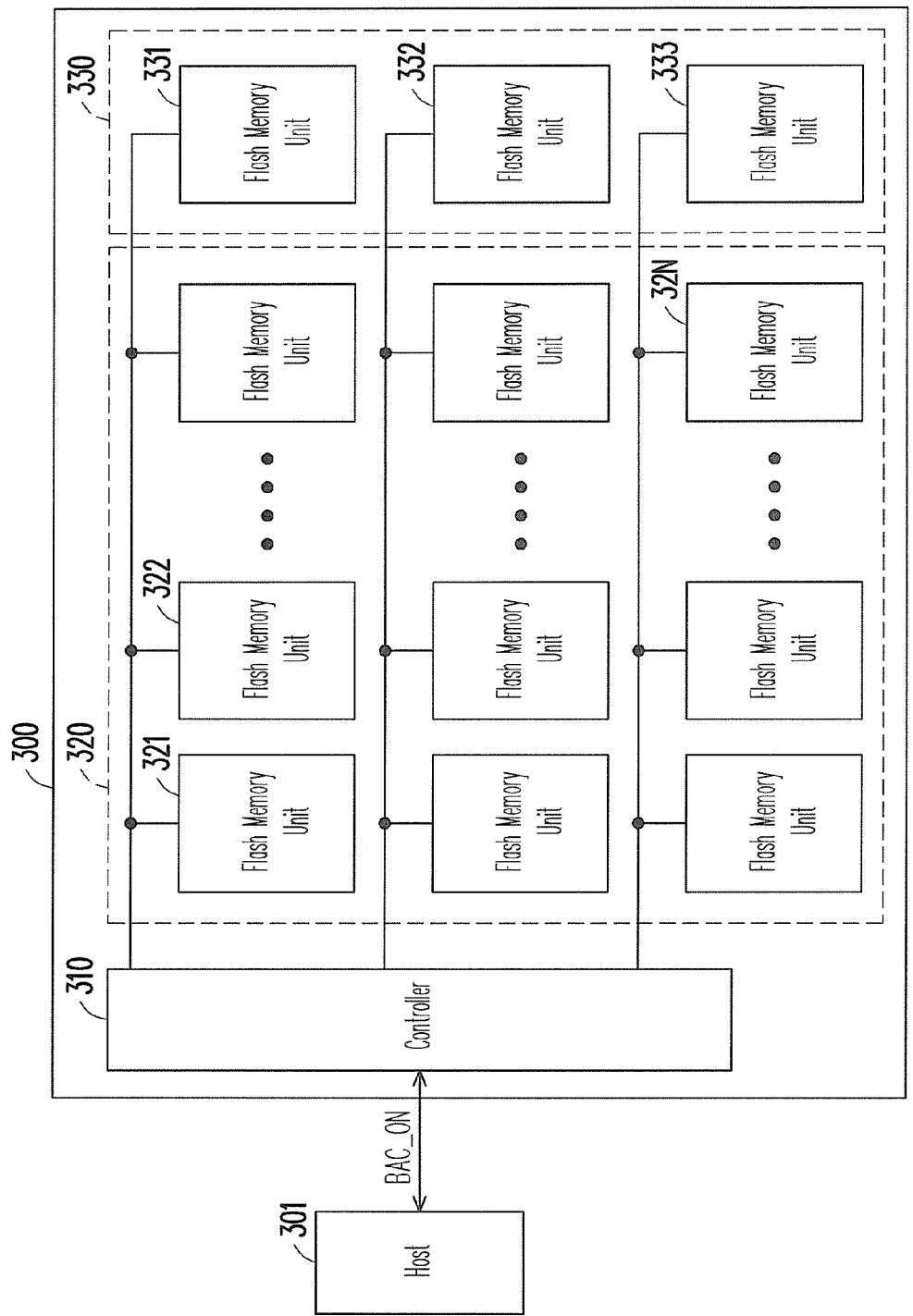
FIG. 3 illustrates one implementation of configuring the flash memory module according to one embodiment of the present invention

Also referring to FIG. 3 which illustrates one implementation of configuring the flash memory module according to one embodiment of the present invention, the flash memory module 300 is connected to a host 301. The flash memory module 300 includes a controller 310 and flash memory units 321-32N and 331-333. When the backup function enabling signal BAC_ON transported from the host 301 and received by the controller 310 is enabled, the controller 310 configures the flash memory units 321-32N as a main storage area 320 and configures the flash memory unit 331-333 as a backup storage area 330. While the backup storage area 330 includes three flash memory units 331-333 in the illustrated embodiment, the number of the flash memory units of the backup storage area 330 may be modified depending upon user's needs. That is, when the host 301 sends the backup function enabling signal BAC_ON is enabled, the user may set the number of the flash memory units in the backup storage area 330. The minimum number of the flash memory units in the backup storage area 330 is one. Moreover, the number of flash memory unit in the backup storage area can be set according to a predetermined ratio between the number of the flash memory units in the backup storage area 330 and the number of the flash memory units in the main storage area 320.

In addition, when the backup function enabling signal BAC_ON the controller 310 receives from the host 301 is disabled, the controller 310 configures all of the flash memory units 321-32N, 331-333 as the main storage area 320.

Referring again to FIG. 2, after completing the configuration of the main storage area and the backup storage area of the flash memory module, the controller checks and receives an updated status of important data saved in the main storage area, and backs up the important data to the backup storage area according to the updated status (S230). Here, the flash memory units of the backup storage area are used to back up the important data saved in the flash memory units of the main storage area. The important data can be designated by different manners. In one embodiment, the host may send an instruction to the controller to set a piece of data to be designated as the important data. In other one of embodiment, a type of data saved in the main storage area may be designated as the important data. The controller backs up the important data into the backup storage area. The controller also detects the updated status of the important data in the main storage area and backs up the updated important data into the backup storage area according to this updated status.

In addition, the controller may determine the updated status according to the latest dates of updating the important data in the main storage area and in the backup storage area. In one exemplary embodiment, if the latest date of updating the important data in the backup storage area is earlier than the latest data of updating the important data in the main storage area, it indicates that the important data backed up in the backup storage area is old and the important data of the main storage area must be written into the backup storage area. In other exemplary embodiment, the controller may also check whether contents of the important data in the main storage area and the contents in the backup storage area are the same. If the contents of the important data in the main storage area and the backup storage area are different, the controller writes the important data of the main storage area into the backup storage area.

It is noted that the flash memory units 331-333 of the backup storage area 330 can be formatted by the controller 310.

Notably, in the present embodiment, after the flash memory units are all configured as either the main storage area or the backup storage area, when the controller accesses the flash memory units of the main storage area and the backup storage area, the wear leveling accessing actions performed with respect to the main storage area and the backup storage area are independent from each other. That is, when the controller performs the wear leveling accessing actions with respect to the main storage area, it is not necessary for the controller to write data into the flash memory units of the backup storage area. Similarly, when the controller performs the wear leveling accessing actions with respect to the backup storage area, the controller may not write data into the flash memory units of the main storage area.

As described above, in the present embodiment, when the flash memory unit of the main storage area is accessed, the backup storage area is not accessed simultaneously. Therefore, all the flash memory units of the backup storage area can currently be disabled to reduce unnecessary power consumption. Similarly, when the flash memory unit of the backup storage area is accessed, all the flash memory units of the main storage unit can be disabled to reduce power consumption.

Figure 4:
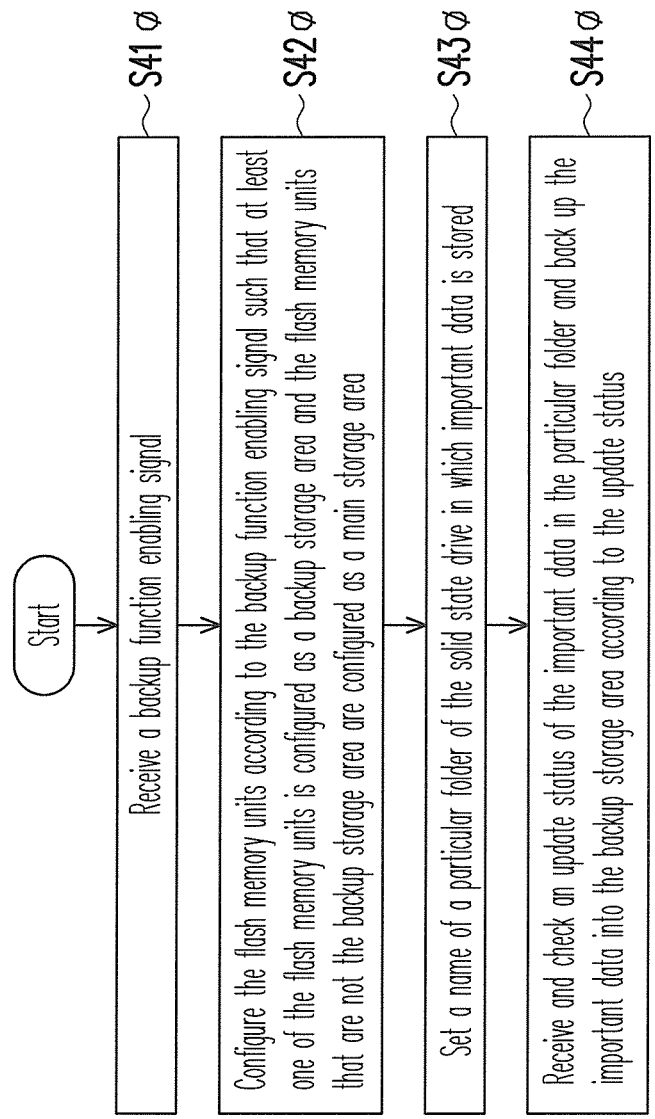
FIG. 4 is a flow chart of a data backup method for a solid state drive (SSD) according to another embodiment of the present invention.

FIG. 4 is a flow chart of a data backup method for a solid state drive (SSD) according to another embodiment of the present invention. The SSD includes a plurality of flash memory units. In the data backup method, a controller embedded in the SSD firstly receives a backup function enabling signal from a host (e.g. a computer) (S410). The controller then configures the flash memory units according to the backup function enabling signal such that at least a part of the flash memory units is configured as a backup storage area and the other parts of the flash memory units are configured as a main storage area (S420). In configuring the backup storage area by the controller, the number of the flash memory units of the backup storage area may be set by the user, or the number of the flash memory units of the main storage area and of the backup storage area may be set according to a fixed ratio. The host may set the data saved in a particular folder of the SSD as important data (S430), and receives and checks updated status of the important data in the particular folder. The controller then backs up the important data into the backup storage area according to the updated status (S440). It should be understood that, in the present embodiment, the data accessing actions performed by the controller with respect to the backup storage area and the main storage area are independent.

It is noted that the flash memory units of the backup storage area can be formatted by the controller.

The backup method for an SSD is further described below by way of a particular example.

Figure 5:
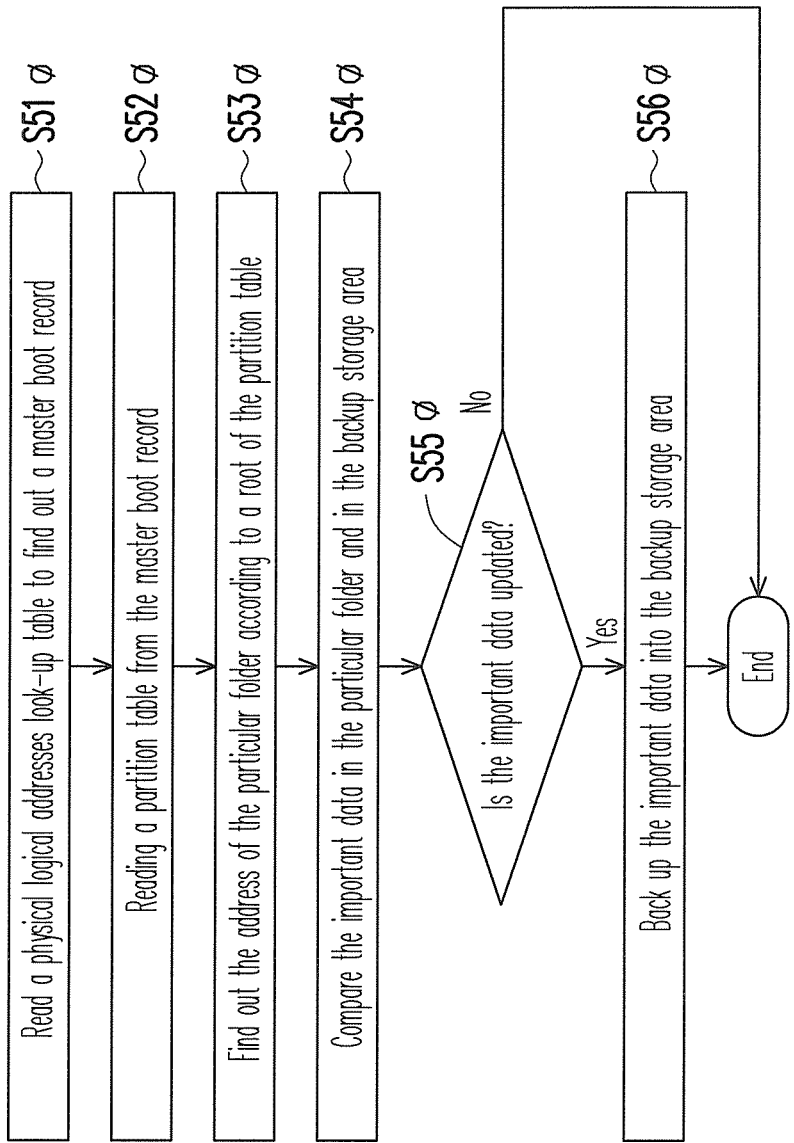
FIG. 5 is a flow chart of a backup method for an SSD according to one embodiment of the present invention.

FIG. 5 is a flow chart of a backup method for an SSD according to one embodiment of the present invention. Referring to FIG. 5, in the course of receiving and checking the updated status of the important data in a preset particular folder for data backup by the controller, the controller first searches for a physical logical addresses look-up table saved in the SSD to find out a master boot record (MBR) (S510). The controller then reads a partition table from the MBR and obtains the address and format of the partition table (S520). After obtaining the address and format of the partition table, the controller then finds out the address of the particular folder according to a root directory of the partition table, and compares the updated status of the important data of the particular folder against the updated status of the important data of the backup storage area (S540). Once the controller detects that the important data has been updated (S550), the updated important data is backed up into the backup storage area (S560).

It is noted that, under the architecture of the present embodiment, the user may execute a program through the host to have the controller read the backup important data from the backup storage area and display a list of the important data on a display of the host. The user may copy a part or all of the important data into another storage device or a position of the main storage area where the particular folder is not located through an interface provided by the program.

In summary, in embodiments of the present invention, multiple flash memory units are designated as either the main storage area or the backup storage area, and the wear leveling accessing actions performed with respect to the main storage area and the backup storage area are independent from each other. Therefore, the data backup for flash memory module and SSD is effectively simplified. The present method can be carried out by the controller embedded in the flash memory module and SSD without the need of additional software and/or hardware.

The foregoing description of the preferred embodiments of the invention has been presented for purposes of illustration and description. It is not intended to be exhaustive or to limit the invention to the precise form or to exemplary embodiments disclosed.

What is claimed is:

1. A data backup method for a flash memory module, the flash memory module having a plurality of flash memory units, the method comprising:
   providing a controller to receive a backup function enabling signal;
   configuring the plurality of flash memory units as a backup storage area and a main storage area by the controller according to the backup function enabling signal; and
   checking and receiving an updated status of an designated data in the main storage area by the controller and backing up the designated data into the backup storage area according to the updated status, wherein the controller independently accessing to the backup storage area and the main storage area;
   wherein the plurality of flash memory units is configured as the backup storage area and the main storage area by the controller according to a fixed ratio.

2. The data backup method according to claim 1, wherein the updated status is obtained by comparing a latest updated date of the designated data in the main storage area and that in the backup storage area.

3. The data backup method according to claim 1, wherein the updated status is obtained by comparing contents of the designated data in the main storage area and contents of the designated data in the backup area.

4. The data backup method according to claim 1, further comprising formatting the flash memory units of the backup storage area by the controller.

5. A data backup method for a solid state drive having a plurality of flash memory units, the data backup method comprising:
   providing a controller to receive a backup function enabling signal;
   configuring the plurality of flash memory units as a backup storage area and a main storage area by the controller according to the backup function enabling signal;
   providing the controller to set a particular folder of the solid state drive and the particular folder is used to save an designated data; and
   receiving and checking an updated status of the designated data in the particular folder by the controller and backing up the designated data into the backup storage area according to the updated status, wherein the controller independently accessing to the backup storage area and accessing to the main storage area;
   wherein the plurality of flash memory units is configured as the backup storage area and the main storage area by the controller according to a fixed ratio.

6. The data backup method according to claim 5, further comprising formatting the flash memory units of the backup storage area by the controller.

7. The data backup method according to claim 5, the step of receiving and checking an updated status of the designated data in the particular folder by the controller comprising
   reading a physical logical addresses look-up table to find out a master boot record;
   reading a partition table from the master boot record;

finding out the address of the particular folder according to a root directory of the partition table; and comparing the designated data in the particular folder and the designated data in the backup storage area to obtain the updated status.

8. The data backup method according to claim 7, the step of comparing the designated data in the particular folder and in the backup storage area to obtain the updated status using the controller comprising comparing the latest updated date of the designated data in the particular folder and the latest updated date in the backup storage area to obtain the updated status.

9. The data backup method according to claim 7, wherein the step of comparing the designated data in the particular folder and the designated data in the backup storage area to obtain the updated status using the controller comprising providing the controller to obtain the updated status by detecting whether contents of the designated data in the particular folder and contents of the designated data in the backup storage area are the same.

10. The data backup method according to claim 5, further comprising:

reading the designated data from the backup storage area by the controller; and copying at least a part of the designated data into a storage device at which the particular folder of the main storage area is located.

11. A data backup method by using a controller in a flash memory module having a plurality of flash memory units, comprising the steps of:

receiving a backup function enabling signal; configuring the plurality of flash memory units as a backup storage area and a main storage area; and checking and receiving a status of an designated data in the main storage area and saving the designated data into the backup storage area according to the status;

wherein the step of configuring the plurality of flash memory units as a backup storage area and a main storage area is according to a fixed ratio.

12. The data backup method according to claim 11, wherein the status of the designated data in the main storage area is obtained by comparing a latest updated date of the designated data in the main storage area and that in the backup storage area.

* * * * *